United States Patent
De Geronimo

(10) Patent No.: US 10,126,167 B2
(45) Date of Patent: Nov. 13, 2018

(54) PHOTON COUNTER WITH PILE-UP REJECTION

(71) Applicant: Brookhaven Science Associates, LLC, Upton, NY (US)

(72) Inventor: Gianluigi De Geronimo, Syosset, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 120 days.

(21) Appl. No.: 15/408,488

(22) Filed: Jan. 18, 2017

(65) Prior Publication Data

US 2017/0205284 A1 Jul. 20, 2017

Related U.S. Application Data

(60) Provisional application No. 62/280,734, filed on Jan. 20, 2016.

(51) Int. Cl.
*G01T 1/24* (2006.01)
*G01J 1/44* (2006.01)

(52) U.S. Cl.
CPC .......... *G01J 1/44* (2013.01); *G01J 2001/442* (2013.01)

(58) Field of Classification Search
CPC .......... G01J 1/44; G01J 2001/442; G01T 1/24

USPC .......... 250/214 R, 370.01–370.15
See application file for complete search history.

(56) References Cited

U.S. PATENT DOCUMENTS

| | | | | |
|---|---|---|---|---|
| 4,618,775 A | * | 10/1986 | Persyk | G01T 1/208 250/369 |
| 7,696,483 B2 | * | 4/2010 | Tkaczyk | G01T 1/171 250/370.06 |
| 8,354,650 B2 | | 1/2013 | Grosholz, Jr. et al. | |

* cited by examiner

*Primary Examiner* — Seung C Sohn
(74) *Attorney, Agent, or Firm* — Dorene M. Price

(57) ABSTRACT

Technologies are described for methods and systems effective to detect photon receiving events. A first comparator may compare a magnitude of a photon signal to a first threshold voltage to produce a first output. A second comparator may compare the magnitude of the photon signal to a second threshold voltage to produce a second output. A counter control circuit may increment a second counter in response to a determination that the magnitude of a first peak of the photon signal exceeds and then falls below the second threshold voltage. The counter control circuit may prevent a third counter from incrementing in response to a second peak of the photon signal. The counter control circuit may increment the first counter in response to the magnitude of the signal exceeding and then falling below the first threshold voltage. The first counter may be associated with a number of photon receiving events detected.

20 Claims, 4 Drawing Sheets

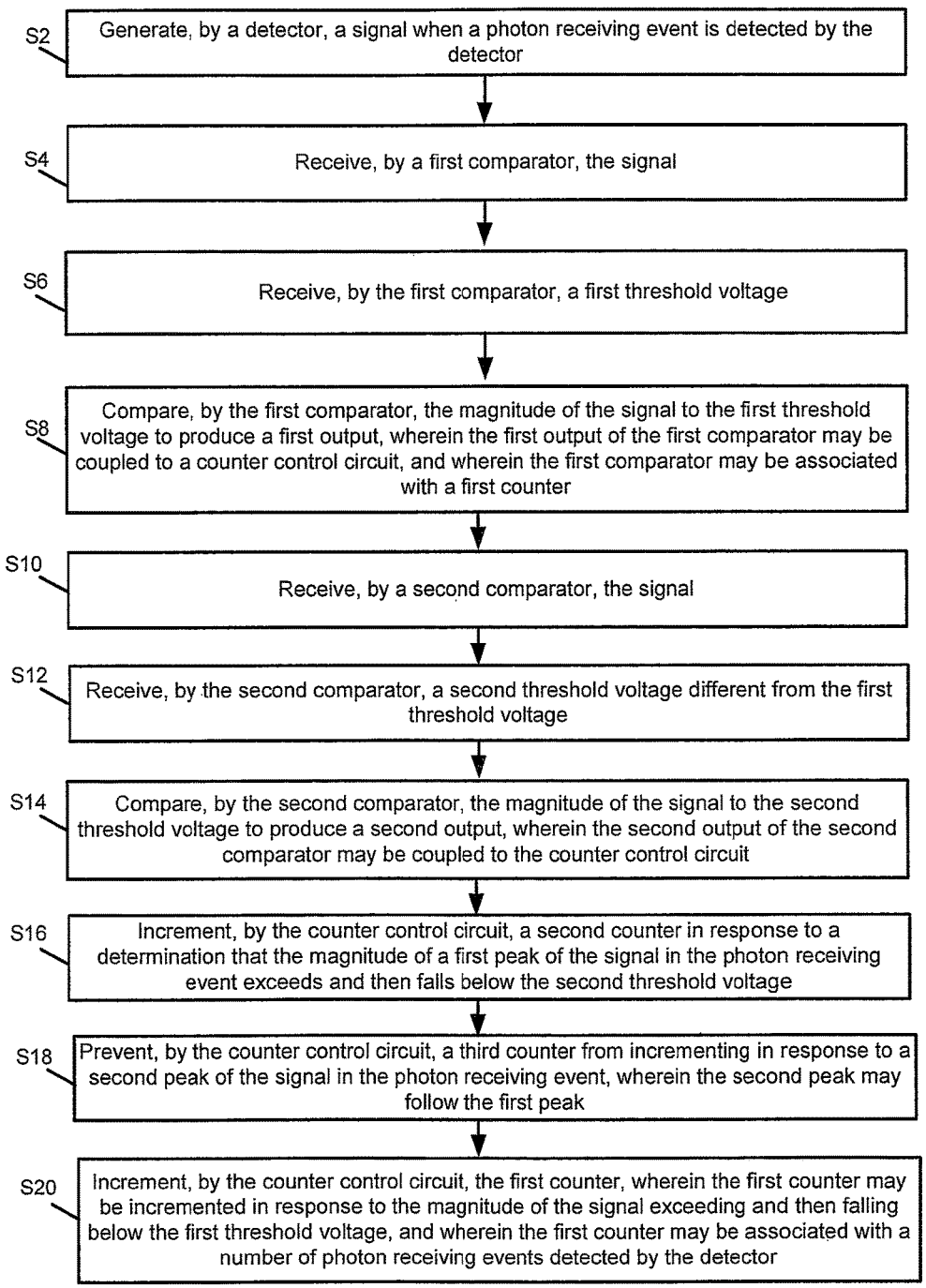

PHOTON COUNTER WITH PILE-UP REJECTION

STATEMENT OF GOVERNMENT RIGHTS

The present application was made with government support under contract number DE-SC0012704 awarded by the U.S. Department of Energy. The United States government has certain rights in the invention(s).

FIELD OF THE INVENTION

This disclosure relates generally to counting systems and electronics, and specifically for radiation detectors.

BACKGROUND

Radiation detectors may detect and count photons of light. Radiation detectors may include a surface which absorbs photons and produces an effect, such as a current or a voltage, which may be proportional to the number and/or energy of photons absorbed. The current or voltage output may be processed to determine characteristics of the particles absorbed by the radiation detector.

SUMMARY

In some examples, photon counting systems are generally described. In various examples, the photon counting systems may include a detector effective to generate a signal when a photon receiving event is detected by the detector. The photon counting systems may further include a first comparator. The first comparator may be effective to receive the signal. In some other examples, the first comparator may be further effective to receive a first threshold voltage. In various other examples, the first comparator may be effective to compare the magnitude of the signal to the first threshold voltage to produce a first output. In some examples, the first output of the first comparator may be coupled to a counter control circuit. In various examples, the first comparator may be coupled to a first counter. In some examples, the photon counting systems may further include a second comparator effective to receive the signal. In examples, the second comparator may be further effective to receive a second threshold voltage different from the first threshold voltage. In further examples, the second comparator may be further effective to compare the magnitude of the signal to the second threshold voltage to produce a second output. In some examples, the second output of the second comparator may be coupled to the counter control circuit. In various examples, the counter control circuit may be effective to increment a second counter in response to a determination that the magnitude of a first peak of the signal in the photon receiving event exceeds and then falls below the second threshold voltage. In various other examples, the counter control circuit may be further effective to prevent a third counter from incrementing in response to a second peak of the signal in the photon receiving event. In some examples, the second peak may follow the first peak. In other examples, the counter control circuit may be further effective to increment the first counter. In some examples, the first counter may be incremented in response to the magnitude of the signal exceeding and then falling below the first threshold voltage. In various further examples, the first counter may be associated with a number of photon receiving events detected by the detector.

In some examples, methods to increment counters in response to photon detection are generally described. In various examples, the methods may include generating, by a detector, a signal when a photon receiving event is detected by the detector. In some further examples, the methods may include receiving, by a first comparator, the signal. In some examples, the methods may further include receiving, by the first comparator, a first threshold voltage. In some examples, the methods may further include comparing, by the first comparator, the magnitude of the signal to the first threshold voltage to produce a first output. In some examples, the first output of the first comparator may be coupled to a counter control circuit. In various examples, the first comparator may be associated with a first counter. In some further examples, the methods may further include receiving, by a second comparator, the signal. In some examples, the methods may further include receiving, by the second comparator, a second threshold voltage different from the first threshold voltage. In various examples, the methods may further include comparing, by the second comparator, the magnitude of the signal to the second threshold voltage to produce a second output. In some examples, the second output of the second comparator may be coupled to the counter control circuit. In some other examples, the methods may further include incrementing, by a counter control circuit, a second counter in response to a determination that the magnitude of a first peak of the signal in the photon receiving event exceeds and then falls below the second threshold voltage. In various further examples, the methods may further include preventing, by the counter control circuit, a third counter from incrementing in response to a second peak of the signal in the photon receiving event. In some examples, the second peak may follow the first peak. In other examples, the methods may further include incrementing, by the counter control circuit, the first counter. In various examples, the first counter may be incremented in response to the magnitude of the signal exceeding and then falling below the first threshold voltage. In various examples, the first counter may be associated with a number of photon receiving events detected by the detector.

In some examples, counter control circuits are generally described. In various examples, the counter control circuits may include a first circuit component, a second circuit component, and a third circuit component. In some examples, the first circuit component may be effective to generate a first counter advance signal. In various examples, the first counter advance signal may be effective to increment a first counter in response to a first transition of a first input signal of the first circuit component from a first logic state to a second logic state. In some examples, the first input signal may transition from the first logic state to the second logic state in response to a magnitude of a photon receiving event exceeding and then falling below a first threshold voltage. In various further examples, the second circuit component may be effective to generate a second counter 'advance signal. In some examples, the second counter advance signal may be effective to increment a second counter disposed at an output of the second circuit component in response to a second transition of a second input signal of the second circuit component from a third logic state to a fourth logic state. In various examples, the second input signal may transition from the third logic state to the fourth logic state in response to a first peak of the photon receiving event exceeding and then falling below a second threshold voltage. In other examples, the second circuit component may be further effective to output a control signal in response to generation of the second counter advance signal. In various further examples, the third circuit component may be effective to receive the control signal. In some further examples, the third circuit component may be further effective to prevent, based on the control signal, a third counter from incrementing in response to a second peak of the photon receiving event. In some examples, the second peak may follow the first peak.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 depicts a flow diagram of an example process to implement a photon counter with pile-up rejection;

Figure 1:
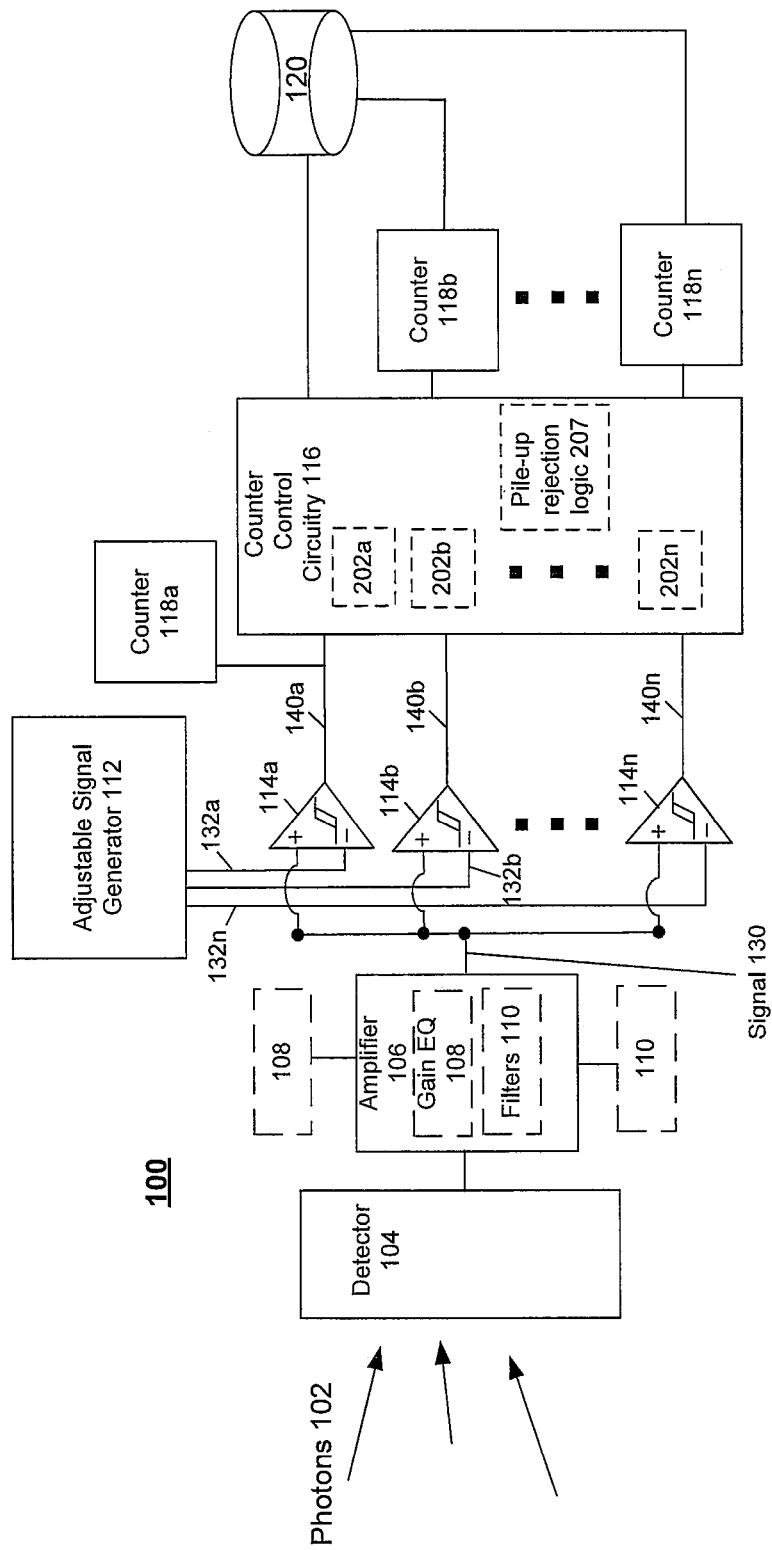
FIG. 1 is a system drawing illustrating a photon counter with pile-up rejection.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are explicitly contemplated herein.

FIG. 1 is a system drawing illustrating a photon counter with pile-up rejection system 100, arranged in accordance with at least some embodiments presented herein. Photon counter with pile-up rejection system 100 may include a detector 104 effective to generate a signal when a photon receiving event or radiation event is detected by detector 104. For example, detector 104 may be effective to absorb photons 102 and produce respective charges which are proportional to the energy of the absorbed photons 102. In some examples, photons 102 may include particles from gamma rays, X-rays, or other electromagnetic radiation. Charges generated by detector 104 as a consequence of absorbing photons 102 may be output from detector 104 as a current and/or a voltage signal. Voltage and/or current signals output from detector 104 may be provided as input to an amplifier 106.

Amplifier 106 may be effective to amplify the voltage and/or current signals received from detector 104. Amplifier 106 may include, or may be configured to be in communication with, gain equalization circuitry 108 ("Gain EQ 108") and/or filters 110. In some examples, Gain EQ 108 may be effective to adjust the gain of signals output from amplifier 106. For example, if detector 104 detects two radiation events of the same energy, Gain EQ 108 may be effective to ensure that the amplified signals output from Gain EQ 108 have the same voltage values. Amplifier 106 may further include one or more filters 110. Filters 110 may be effective to filter out undesired portions of signals output from amplifier 106. For example, filters 110 may be pass band filters effective to increase a signal to noise ratio of signals output from amplifier 106.

Amplifier 106 may output signal 130. As described above, signal 130 may be filtered, amplified, equalized, and/or otherwise conditioned. Signal 130 may be sent as an input to comparators 114 (including a plurality of comparators 114a, 114b, . . . , 114n). Adjustable signal generator 112 may be effective to provide threshold signals 132 (including a plurality of signals 132a, 132b, . . . , 132n) to inputs of comparators 114. In some examples, threshold signals 132 may be voltages or currents. In various further examples, and as described in further detail below, threshold signals 132 may be threshold voltages used to measure amplitudes or energy levels of photon receiving events and/or count a number of photon receiving events detected by detector 104. Adjustable signal generator 112 may be programmable or otherwise adjustable such that values or magnitudes of threshold signals 132 may be selected and adjusted. A photon receiving event may be identified over time by the magnitude of signal 130 rising above, and subsequently falling below, the lowest value threshold signal 132.

Comparators 114 may be effective to receive signal 130 and respective threshold signals 132. Comparators 114 may be coupled to counter control circuitry 116. Comparators 114 may be further effective to compare the magnitude of signal 130 to respective values of threshold signals 132. For example, comparator 114a may compare signal 130 to threshold signal 132a, comparator 114b may compare signal 130 to threshold signal 132b, etc. In some examples, when signal 130 exceeds a particular threshold signal 132, a particular comparator 114 may be effective to output signals 140 (including signals 140a, 140b, . . . , 140n) to counter control circuitry 116. Output signals 140 may be, for example, a logic high (e.g., a logic level "1") or a logic low pulse (e.g., a logic level "0").

Counter control circuitry 116, as will be described in further detail below, may include circuitry and/or electronic components effective to determine whether to increase a value of counters 118 (including counters 118a, 118b, . . . , 118n). Counter control circuitry 116 may include one or more flip-flops 202 (including flip-flops 202a, 202b, . . . , 202n). As will be described in more detail below, in some examples, flip-flops 202 may be falling edge triggered D flip-flops. In various other examples, other flip-flops or latches may be used to implement counter control circuitry 116, such as SR latches, JK flip-flops, etc. Counter control circuitry 116 may include pulse pile-up rejection logic 207. In some examples, pile-up rejection logic 207 may be effective to reject one or more peaks of a particular photon receiving event. Counters 118 may correspond to and/or be associated with particular comparators 114 and to threshold signals 132. For example, counter 118a may correspond to comparator 114a and threshold signal 132a. Values associated with counters 118 may be representative of a number of photon receiving events experienced by detector 104 at various energy levels. In some examples, values associated with various counters 118 may be stored in memory 120. Although a single memory 120 is depicted, more than one memory may be used to store values associated with counters 118. For example, each counter 118 may be associated with a respective memory 120.

In some examples, a value associated with counter 118a may reflect a number of photon strikes with an energy level which exceeds a magnitude of threshold signal 132a. In other words, a value associated with counter 118a may reflect a number of photon receiving events. In some examples, the value associated with counter 118a may reflect a total number of photon receiving events detected during a period of time irrespective of a number of peaks detected during any particular whole photon receiving event. Similarly, a value associated with counter 118b may reflect a number of photon strikes or peaks with an energy level which exceeds a magnitude of threshold signal 132b. Pile-up rejection may be realized before the completion of the whole photon receiving event by counter control circuitry 116 preventing values of counters 118 from incrementing due to subsequent peaks of signal 130, until signal 130 falls below the lowest threshold signal 132. Additionally, counter control circuitry 116 may include logic effective to increment a particular counter 118 corresponding to the lowest threshold signal 132 during each photon receiving event. For example, if threshold signal 132a has the lowest voltage among threshold signals 132, counter control circuitry 116 may be effective to increment or otherwise increase the value of counter 118a during each photon receiving event when the magnitude of signal 130 exceeds and then falls below the value of threshold signal 132a. As will be discussed in further detail below, counter 118a may be disposed at, and coupled to, the output of comparator 114a, while other counters 118b . . . 118n may be disposed at, and coupled to, outputs of counter control circuitry 116.

Figure 2:
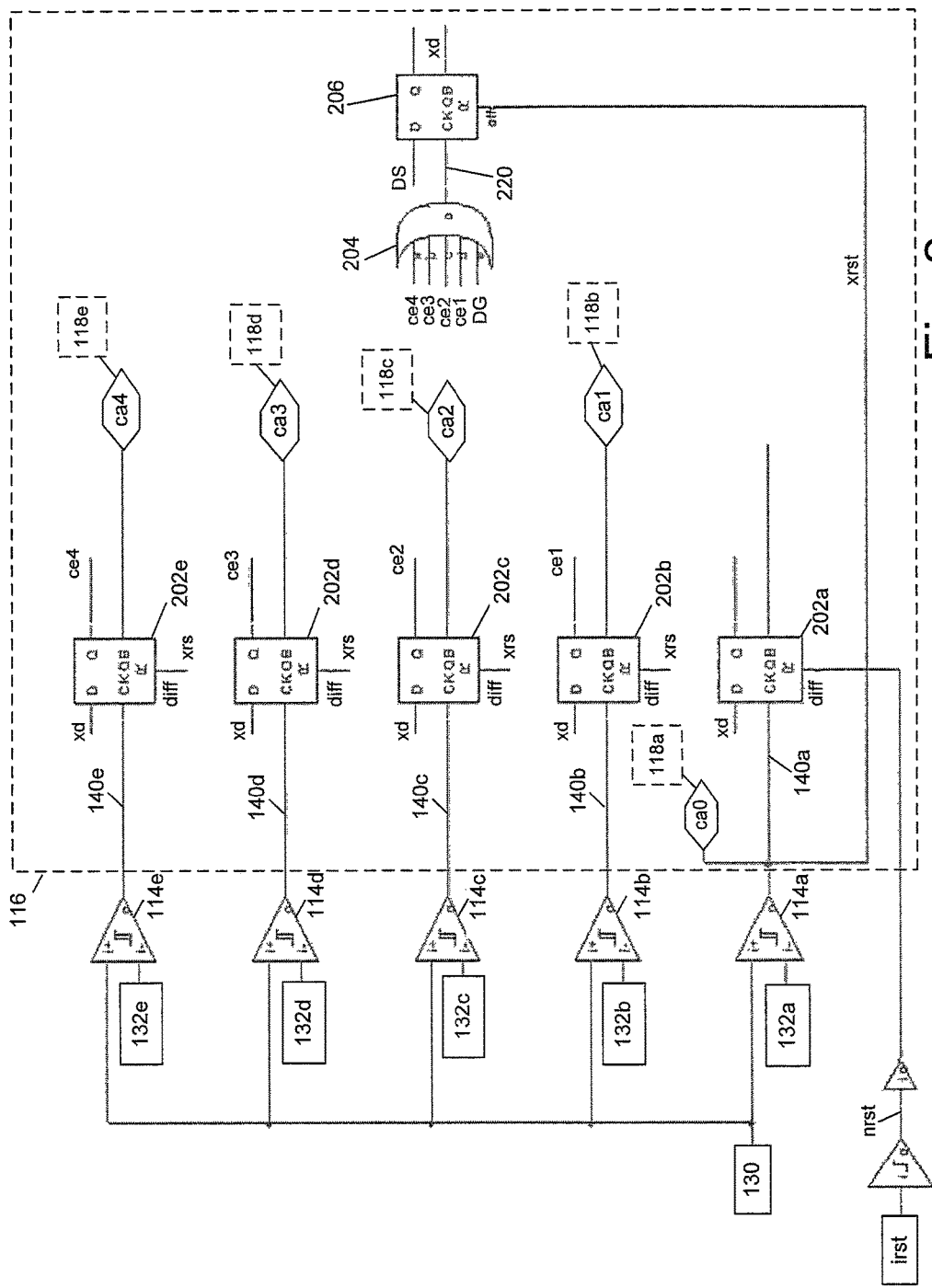
FIG. 2 is a system drawing of counter control circuitry for a photon counter with pile-up rejection.

FIG. 2 is a system drawing of counter control circuitry 116 for a photon counter with pile-up rejection. Those components of FIG. 2 which were described in FIG. 1 will not be discussed again for purposes of clarity and brevity.

FIG. 2 depicts signal 130 as inputs to comparators 114a, 114b, 114c, 114d, and 114e. Signal 130 may be the amplified and/or gain equalized signal generated by detector 104 of FIG. 1. Threshold signals 132a, 132b, 132c, 132d, and 132e may serve as respective inputs to comparators 114a, 114b, 114c, 114d, and 114e. Comparators 114a, 114b, 114c, 114d, and 114e output respective signals 140a, 140b, 140c, 140d, and 140e to the clock/enable ("CK") input of respective flip-flops 202a, 202b, 202c, 202d, and 202e. A control signal "xd" may also input to the D input of flip-flops 202 (including flip-flops 202a, 202b, 202c, 202d, and 202e). As will be discussed in further detail below, the control signal xd may be initialized at a logic high state and may be returned to the initialized logic high state upon a reset of a flip-flop 206 coupled to a NOR gate. As will be described in further detail below, control signal xd may be effective to enable/disable those counters 118b, . . . , 118n disposed at outputs of flip-flops 202 of counter control circuitry 116.

In FIG. 2, the dashed box may represent an example implementation of counter control circuitry 116 from FIG. 1. In the example implementation, flip-flops 202a, 202b, 202c, 202d, and 202e may output corresponding counter advance signals ca0, ca1, ca2, ca3, and ca4 at the inverting outputs of flip-flops 202. Flip-flops 202b, 202c, 202d, and 202e may output counter enable signals ce1, ce2, ce3, and ce4 at the non-inverting outputs of flip-flops 202. Output of comparators 114 received by counters 118 may be subject to change or modification. As will be discussed in further detail below, values of counters 118 may be increased on falling edges of counter advance signals ca0, ca1, ca2, ca3, and/or ca4. Counter enable signals ce1, ce2, ce3, and ce4, along with a digital ground "DG" may be input into a NOR gate 204. An output of NOR gate 204 may be coupled to flip-flop 206 along with a source voltage "DS".

In an example, threshold signal 132a may have the lowest voltage from among threshold signals 132. In such an example, threshold signal 132a may be the lowest voltage threshold. When the voltage of signal 130 has exceeded the voltage of threshold signal 132a, the value of counter 118a, corresponding to comparator 114a, will be increased during the next falling edge of ca0. The falling edge of ca0 may occur when the output of comparator 114a goes from logic high to logic low, which, in turn, occurs when the value of signal 130 falls below the value of threshold signal 132a.

As will be discussed in further detail below, for comparators 114b, 114c, 114d, and 114e, only the value of the particular counter 118 which is associated with the comparator 114, which experiences the first falling edge of its respective counter advance signal will be increased, during a single photon receiving event. Additionally, the value of counter 118a may be advanced each time the value of signal 130 has fallen below threshold signal 132a. The value of counter 118a may be useful in estimating or counting the total number of events where the voltage of signal 130 exceeds the voltage of threshold signal 132a and where the voltage of signal 130 did not exceed the next threshold voltage. The value of counter 118a will likely be larger than values of other counters 118 associated with other threshold signals 132. The difference between the value of the counter 118a and values of other counters 118 may identify the number of events where the voltage exceeded the threshold signal 132a but not the next threshold signals 132. The difference may also provide information about the total number of events.

Reset circuitry may be provided and coupled to counter control circuitry 116. Reset circuitry may be effective to reset flip-flops 202 and 206 to initialized states. In some examples, signals "irst", "nrst", "xrs" and "diff" may be effective to reset flip-flops 202 and/or 206.

Figure 3:
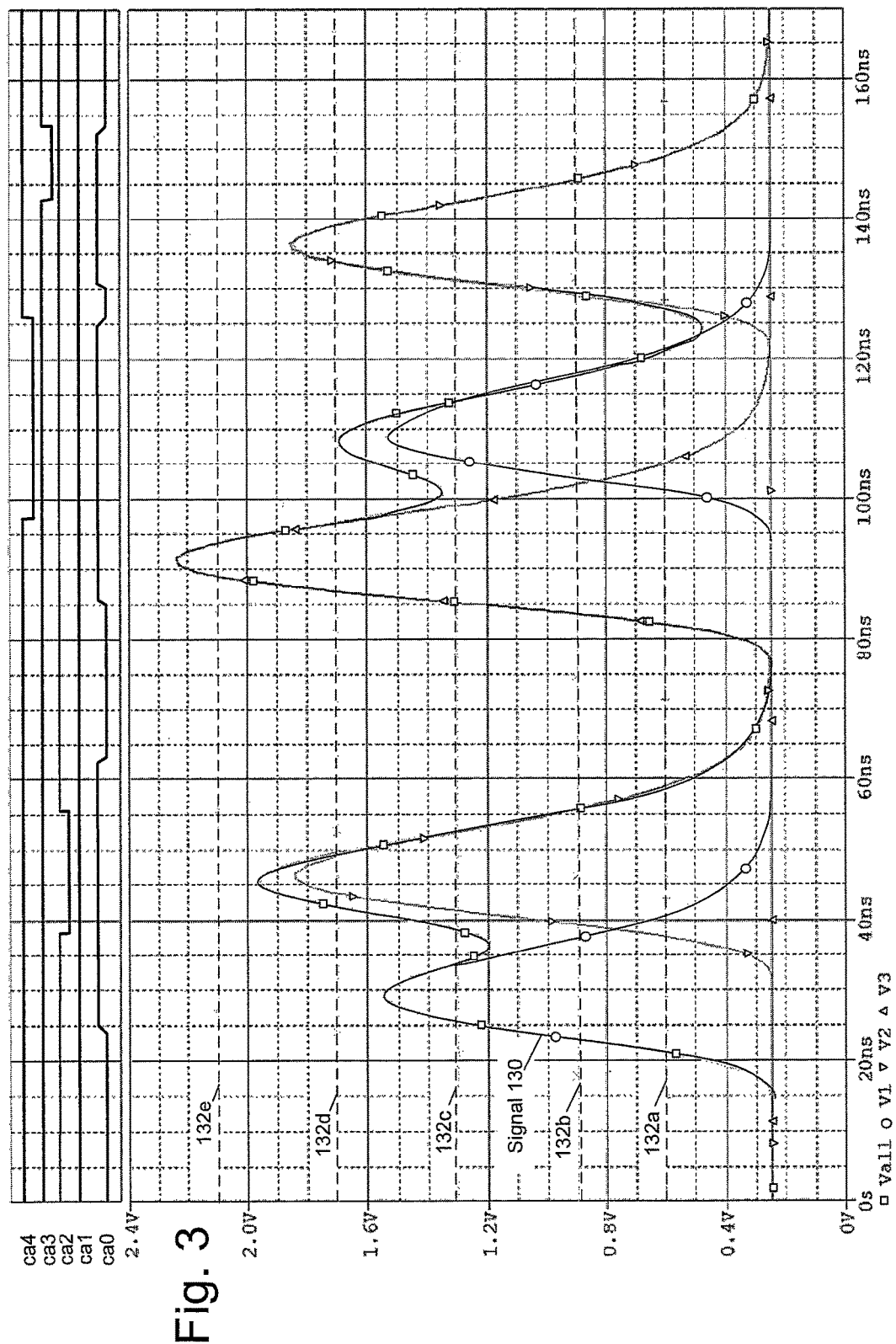
FIG. 3 is in part a timing diagram illustrating an example of pile-up rejection capability of a photon counter with pile-up rejection and in part a plot of a signal representing three photon receiving events.

FIG. 3 is in part a timing diagram illustrating an example of pile-up rejection capability of a photon counter with pile-up rejection and in part a plot of a signal representing three photon receiving events. FIG. 3 will be described in conjunction with FIG. 2.

FIG. 3 depicts a plot of signal 130 representing three photon receiving events. As described herein, a photon receiving event may be identified by the magnitude of signal 130 exceeding and subsequently falling below the value of the lowest threshold signal 132a. The graph in FIG. 3 represents a plot of voltage vs. time (in nanoseconds "ns") for signal 130. Various photon receiving events of signal 130 are depicted and shown as a curve with multiple peaks on the graph in FIG. 3. In a particular photon receiving event, different pulses of signal 130 may represent pulse pile-up of signal 130 and may cause photon detection error. Different pulses are represented in FIG. 3 using symbols shown along the bottom of the graph. For example, a pulse "V1" is depicted with a small circle along various intervals of the curve shown on the graph in FIG. 3. "Vall" represents the sum of pulses V1, V2, and V3, and may represent the signal 130 perceived by detector 104 and counter control circuitry 116. Threshold signals 132a, 132b, 132c, 132d, and 132e are depicted as static voltages represented by horizontal dashed lines. Threshold signals 132 may be threshold voltages provided to comparators 114 and may be used to measure relative amplitudes of peaks of signal 130.

Near the top of FIG. 3, specifically, a timing diagram is shown for the counter advance signals ca0, ca1, ca2, ca3, and ca4 (introduced in FIG. 2). Counter advance signal ca0 may go from logic low to logic high when the voltage of signal 130 exceeds the voltage threshold signal 132a (e.g., corresponding to a Level 0). For example, at approximately 22 ns, the voltage of signal 130 exceeds Level 0. Level 0 may correspond to the voltage of threshold signal 132a provided to comparator 114a (shown in FIG. 2). As a result, comparator 114a will output a logic high signal and ca0 goes high after a short delay.

At about 34 ns, the falling edge voltage of signal 130 crosses the voltage of threshold signal 132c (e.g., corresponding to a Level 2). The crossing of threshold signal 132c by signal 130 may represent the first time signal 130 has crossed a threshold signal 132 during a falling edge of a peak of signal 130. When the value of signal 130 falls below threshold signal 132c, signal 140c (from FIG. 2) may transition from a logic high state to a logic low state. Now, with reference to FIG. 2, when signal 140c makes the transition from logic high to logic low, flip-flop 202c will sample the input control signal xd, which is initialized to logic high. Flip-flop 202c may then output a logic high counter enable signal ce2. The inverting output of flip-flop 202c will fall from logic high to logic low. Since the inverting output of flip-flop 202c is tied to counter advance signal ca2, ca2 will experience a falling edge. As shown in FIG. 3, ca2 experiences a falling edge at approximately 38 ns. When ca2 experiences the falling edge, a value of counter 118c may be incremented or otherwise increased. Accordingly, the value of counter 118c may be related to a number of photon receiving events detected by detector 104 with an energy level associated with threshold signal 132c.

To continue the example, logic high counter enable signal ce2 may serve as an input to NOR gate 204. An output signal 220 from NOR gate 204 may then transition from logic high to logic low. Flip-flop 206 will sample the input source voltage "DS" when output signal 220 transitions from logic high to logic low. DS may be a digital supply voltage and may be logic high. Accordingly, because control signal xd is coupled to the inverting output of flip-flop 206, control signal xd may transition from logic high to logic low.

Returning to FIG. 3, at approximately 50 ns, the falling edge voltage of a second peak of signal 130 may fall below the voltage of threshold signal 132d. Returning now to FIG. 2, when the magnitude of signal 130 falls below threshold signal 132d, signal 140d will transition from logic high to logic low. At this transition, flip-flop 202d will sample the input control signal xd, which has previously transitioned to logic low. Accordingly, ca3, at the inverting output of flip-flop 202d will remain at logic high and prevent the value of counter 118d from being incremented or otherwise increased. As such, logic of counter control circuitry 116 may effectively prevent subsequent peaks (e.g., falling edge threshold crossings following a first peak) of signal 130 from incrementing counters 118, after an initial falling edge threshold crossing. Preventing counters 118 from incrementing following a first peak of signal 130 may avoid "pile-up" readings which may cause inaccurate photon counts and/or inaccurate amplitude readings. Thus, pulses which may be due to a pile-up error are not counted. As described below, counter control circuitry 116 may reset when the falling edge value of signal 130 falls below lowest threshold signal 132a.

Returning to FIG. 3, at approximately 58 ns, the falling edge voltage of signal 130 crosses the voltage of lowest threshold signal 132a. Counter advance signal ca0 will experience a falling edge when the falling edge voltage of signal 130 falls below the voltage of lowest threshold signal 132a. Accordingly, counter 118a may be incremented. As such, the value of counter 118a may be related to a total number of photon receiving events experienced by photon counter with pile-up rejection system 100. Additionally, with reference to FIG. 2, the transition of signal 140a from logic high to logic low is input to the reset "R" of flip-flop 206. Flip-flop 206 will be reset and the logic level of input control signal xd will be returned to the initial state of logic high. Accordingly, counter control circuitry 116 may now be reset and ready to account for subsequent detection of photon receiving events.

A system in accordance with the present disclosure may provide a photon counter with pile-up rejection. Counter control logic may be used to ignore pile-up pulses during detection of photon receiving events. Thus pile-up pulses may be rejected while also maintaining a running count of all pulses and peak values; rather than just counting peak values. Piled-up pulses may cause inaccurate photon counts and may provide false amplitude readings due to pile-up error. Additionally, a system in accordance with the present disclosure may allow for more accurate photon amplitude detection, as false peaks resulting from pile-up error may be rejected. This may be useful for front-end electronics for sensors, or detectors including but not limited to multi-element detectors or high energy detectors such as for example, CZT, germanium and others.

FIG. 4 illustrates a flow diagram of an example process to implement a Photon counter with pile-up rejection, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, S14, S16, S18, and/or S20. Although illustrated as discrete blocks, various blocks may be divided into additional blocks, combined into fewer blocks, or eliminated, depending on the desired implementation.

Processing may begin at block S2, "Generate, by a detector, a signal when a photon receiving event is detected by the detector". At block S2, a detector, such as detector 104, may generate a signal, such as signal 130, when a photon receiving event is detected.

Processing may proceed from block S2 to block S4, "Receive, by a first comparator, the signal". At block S4, the first comparator, such as comparator 114a, may receive a signal, such as signal 130. In some examples, an amplifier, such as amplifier 106, may be effective to amplify the signal prior to receipt of the signal by the first comparator. In some further examples, a gain equalization circuit, such as gain EQ 108, may be effective to adjust the gain of the signal prior to the receipt of the signal by the first comparator.

Processing may proceed from block S4 to block S6, "Receive, by the first comparator, a first threshold voltage". At block S6, the comparator, such as comparator 114a, may receive a first threshold voltage, such as threshold signal 132a.

Processing may proceed from block S6 to block S8, "Compare, by the first comparator, the magnitude of the signal to the first threshold voltage to produce a first output, wherein the first output of the first comparator may be coupled to a counter control circuit, and wherein the first comparator may be associated with a first counter". At block S8, the first comparator may compare the magnitude of the signal to the first threshold voltage to produce a first output. The first output of the first comparator may be coupled to a counter control circuit, such as counter control circuitry 116. The first comparator may be associated with a first counter, such as counter 118a.

Processing may proceed from block S8 to block S10, "Receive, by a second comparator, the signal". At block S10, a second comparator, such as comparator 114b, may receive a signal, such as signal 130.

Processing may proceed from block S10 to block S12, "Receive, by the second comparator, a second threshold voltage different from the first threshold voltage". At block S12, the second comparator may receive a second threshold voltage, such as threshold signal 132b. The second threshold voltage may be different from the first threshold voltage. In some examples, the first threshold voltage may be lower than the second threshold voltage.

Processing may proceed from block S12 to block S14, "Compare, by the second comparator, the magnitude of the signal to the second threshold voltage to produce a second output, wherein the second output of the second comparator may be coupled to the counter control circuit". At block S14, the second comparator may compare the magnitude of the signal to the second threshold voltage to produce a second output (e.g., signal 140b). The second output of the second comparator may be coupled to the counter control circuit (e.g., counter control circuitry 116).

Processing may proceed from block S14 to block S16, "Increment, by the counter control circuit, a second counter in response to a determination that the magnitude or a first peak of the signal in the photon receiving event exceeds and then falls below the second threshold voltage". At block S16, the counter control circuit may increment a second counter (e.g., counter 118b) in response to a determination that the magnitude of a first peak of the signal (e.g., signal 130) in the photon receiving event exceeds and then falls below the second threshold voltage (e.g., threshold signal 132b). In some examples, a value of the second counter may be related to a number of photon receiving events detected by the detector with an energy level associated with the second threshold voltage.

Processing may proceed from block S16 to block S18, "Prevent, by the counter control circuit, a third counter from incrementing in response to a second peak of the signal in the photon receiving event, wherein the second peak may follow the first peak". At block S18, the counter control circuit may prevent a third counter, such as counter 118d, from incrementing in response to a second peak (e.g., the second peak from the left depicted in FIG. 3) of the signal in the photon receiving event. The second peak may follow the first peak. In some examples, the counter control circuit may be effective to prevent the increment of a counter through generation of a control signal to prevent output by a flip-flop associated with the counter advance signal, in response to a determination that the magnitude of the first peak of the signal in the photon receiving event exceeds and then falls below the second threshold voltage.

Processing may proceed from block S18 to block S20, "Increment, by the counter control circuit, the first counter, wherein the first counter may be incremented in response to the magnitude of the signal exceeding and then falling below the first threshold voltage, and wherein the first counter may be associated with a number of photon receiving events detected by the detector". At block S20, the counter control circuit may increment the first counter (e.g., counter 118a). The first counter may be incremented in response to the magnitude of the signal (e.g., signal 130) exceeding and then falling below the first threshold voltage (e.g., threshold signal 132a). The first counter may be associated with a number of photon receiving events detected by the detector (e.g., detector 104). In some examples, to increment the first counter, the counter control circuitry 116 may be effective to generate a first counter advance signal for the first counter at a first time. The first counter advance signal (e.g., ca0) may be generated when the first output transitions from a first logic state (such as a logic high state) to a second logic state (such as a logic low state). In various examples, a value of the first counter may be related to a total number of photon receiving events detected by the detector irrespective of a number of peaks detected during a particular photon receiving event.

In some examples, the value of the second counter may be increased at a first time and the value of the first counter may be increased at a second time. The second time may be after the first time. After the first time and before the second time, the counter control circuit may be further effective to disable all counters disposed at outputs of the counter control circuit, other than the first counter. In some further examples, the counter control circuit may include respective flip-flops disposed at outputs of the first comparator and the second comparator. After the second time, the counter control circuit may be further effective to reset an input (such as input control signal "xd") to the respective flip-flops to an initialized state.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. A photon counting system comprising:
   a detector effective to generate a signal when a photon receiving event is detected by the detector;
   a first comparator effective to:
      receive the signal;
      receive a first threshold voltage;
      compare a magnitude of the signal to the first threshold voltage to produce a first output, wherein the first output of the first comparator is coupled to a counter control circuit; and
      wherein the first comparator is associated with a first counter;
   a second comparator effective to:
      receive the signal;
      receive a second threshold voltage different from the first threshold voltage; and
      compare the magnitude of the signal to the second threshold voltage to produce a second output, wherein the second output of the second comparator is coupled to the counter control circuit;
   wherein the counter control circuit is effective to:
      increment a second counter in response to a determination that the magnitude of a first peak of the signal in the photon receiving event exceeds and then falls below the second threshold voltage;
      prevent a third counter from incrementing in response to a second peak of the signal in the photon receiving event, wherein the second peak follows the first peak; and increment the first counter, wherein the first counter is incremented in response to the magnitude of the signal exceeding and then falling below the first threshold voltage, and wherein the first counter is associated with a number of photon receiving events detected by the detector.

2. The photon counting system of claim 1, wherein the first threshold voltage is lower than the second threshold voltage.

3. The photon counting system of claim 1, wherein to increment the first counter, the counter control circuit is effective to generate a first counter advance signal for the first counter at a first time, wherein the first counter advance signal is generated when the first output transitions from a first logic state to a second logic state.

4. The photon counting system of claim 1, further comprising:
an amplifier effective to amplify the signal prior to receipt of the signal by the first comparator and the second comparator; and
a gain equalization circuit effective to adjust the gain of the signal prior to the receipt of the signal by the first comparator and the second comparator.

5. The photon counting system of claim 1, wherein a value of the second counter is related to a number of photon receiving events detected by the detector with an energy level associated with the second threshold voltage.

6. The photon counting system of claim 1, wherein a value of the first counter is related to a total number of photon receiving events detected by the detector irrespective of a number of peaks detected during a particular photon receiving event.

7. The photon counting system of claim 1, further comprising:
a third comparator associated with the third counter, the third comparator effective to:
receive the signal;
receive a third threshold voltage different from the first threshold voltage and the second threshold voltage; and
compare the magnitude of the signal to the third threshold voltage to produce a third output, wherein the third output of the third comparator is coupled to the counter control circuit;
wherein to prevent the increment of the third counter, the counter control circuit is effective to:
generate a control signal to prevent output by a flip-flop associated with the third counter of a counter advance signal in response to the determination that the magnitude of the first peak of the signal in the photon receiving event exceeds and then falls below the second threshold voltage.

8. The photon counting system of claim 1, wherein:
a value of the second counter is increased at a first time;
a value of the first counter is increased at a second time, wherein the second time is after the first time; and
after the first time and before the second time, the counter control circuit is further effective to disable all counters disposed at outputs of the counter control circuit, other than the first counter.

9. The photon counting system of claim 8, wherein:
the counter control circuit comprises respective flip-flops disposed at outputs of the first comparator and the second comparator; and
after the second time, the counter control circuit is further effective to reset an input to the respective flip-flops to an initialized state.

10. A method to increment counters in response to photon detection, the method comprising:
generating, by a detector, a signal when a photon receiving event is detected by the detector;
receiving, by a first comparator, the signal;
receiving, by the first comparator, a first threshold voltage;
comparing, by the first comparator, a magnitude of the signal to the first threshold voltage to produce a first output, wherein the first output of the first comparator is coupled to a counter control circuit, and wherein the first comparator is coupled to a first counter;
receiving, by a second comparator, the signal;
receiving, by the second comparator, a second threshold voltage different from the first threshold voltage;
comparing, by the second comparator, the magnitude of the signal to the second threshold voltage to produce a second output, wherein the second output of the second comparator is coupled to the counter control circuit;
incrementing, by the counter control circuit, a second counter in response to a determination that the magnitude of a first peak of the signal in the photon receiving event exceeds and then falls below the second threshold voltage;
preventing, by the counter control circuit, a third counter from incrementing in response to a second peak of the signal in the photon receiving event, wherein the second peak follows the first peak; and
incrementing, by the counter control circuit, the first counter, wherein the first counter is incremented in response to the magnitude of the signal exceeding and then falling below the first threshold voltage, and wherein the first counter is associated with a number of photon receiving events detected by the detector.

11. The method of claim 10, wherein the first threshold voltage is lower than the second threshold voltage.

12. The method of claim 10, wherein incrementing the first counter further comprises, by the counter control circuit, generating a first counter advance signal for the first counter at a first time, wherein the first counter advance signal is generated when the first output transitions from a first logic state to a second logic state.

13. The method of claim 10, further comprising:
amplifying the signal, by an amplifier, prior to receiving the signal by the first comparator and the second comparator; and
adjusting the gain of the signal, by a gain equalization circuit, prior to receiving the signal by the first comparator and the second comparator.

14. The method of claim 10, wherein a value of the second counter is related to a number of photon receiving events detected by the detector with an energy level associated with the second threshold voltage.

15. The method of claim 10, wherein a value of the first counter is related to a total number of photon receiving events detected by the detector irrespective of a number of peaks detected during a particular photon receiving event.

16. The method of claim 10, further comprising:
receiving, by a third comparator, the signal;
receiving, by the third comparator, a third threshold voltage different from the first threshold voltage and the second threshold voltage; and
comparing, by the third comparator, the magnitude of the signal to the third threshold voltage to produce a third output, wherein the third output of the third comparator is coupled to the counter control circuit; and generating, by the counter control circuit, a control signal to prevent output by a flip-flop associated with the third counter of a counter advance signal in response to the determination that the magnitude of the first peak of the signal in the photon receiving event exceeds and then falls below the second threshold voltage.

17. The method of claim 10, wherein:
a value of the second counter is increased at a first time;
a value of the first counter is increased at a second time, wherein the second time is after the first time; and
the method further comprising, after the first time and before the second time, disabling, by the counter control circuit, all counters of the counter control circuit, other than the first counter.

18. A counter control circuit comprising:
a first circuit component;
a second circuit component; and
a third circuit component;
the first circuit component effective to:
  generate a first counter advance signal effective to increment a first counter in response to a first transition of a first input signal of the first circuit component from a first logic state to a second logic state, wherein the first input signal transitions from the first logic state to the second logic state in response to a magnitude of a photon receiving event exceeding and then falling below a first threshold voltage;
the second circuit component effective to:
  generate a second counter advance signal effective to increment a second counter disposed at an output of the second circuit component in response to a second transition of a second input signal of the second circuit component from a third logic state to a fourth logic state, wherein the second input signal transitions from the third logic state to the fourth logic state in response to a first peak of the photon receiving event exceeding and then falling below a second threshold voltage; and
  output a control signal in response to generation of the second counter advance signal;
the third circuit component effective to:
  receive the control signal; and
  prevent, based on the control signal, a third counter from incrementing in response to a second peak of the photon receiving event, wherein the second peak follows the first peak.

19. The counter control circuit of claim 18, wherein the first threshold voltage is lower than the second threshold voltage.

20. The counter control circuit of claim 18, wherein at least one of the first circuit component, the second circuit component, or the third circuit component is a flip-flop.

* * * * *